Nov. 11, 1924.  
H. H. C. GRONDAHL  
WIRE OR THREAD WHIPPING MECHANISM  
Filed Dec. 27, 1923  
1,514,852  
2 Sheets-Sheet 1

Inventor:-  
Hans Henrik C. Grondahl  
by H.A.Pattison  
Atty.

Nov. 11, 1924.  
H. H. C. GRONDAHL  
1,514,852  
WIRE OR THREAD WHIPPING MECHANISM  
Filed Dec. 27, 1923   2 Sheets-Sheet 2

Inventor:-  
Hans Henrik C. Grondahl

Patented Nov. 11, 1924.

1,514,852

UNITED STATES PATENT OFFICE.

HANS HENRIK CHRISTIAN GRONDAHL, OF CHICAGO, ILLINOIS, ASSIGNOR TO WESTERN ELECTRIC COMPANY, INCORPORATED, OF NEW YORK, N. Y., A CORPORATION OF NEW YORK.

WIRE OR THREAD WHIPPING MECHANISM.

Application filed December 27, 1923. Serial No. 682,863.

*To all whom it may concern:*

Be it known that I, HANS HENRIK CHRISTIAN GRONDAHL, a citizen of the United States, residing at Chicago, in the county of Cook and State of Illinois, have invented certain new and useful Improvements in Wire or Thread Whipping Mechanisms, of which the following is a full, clear, concise, and exact description.

In general this invention relates to wire or thread whipping mechanisms, and more particularly to a mechanism for whipping the ends of telephone cords or the like with wire after the insulation has been removed from the ends and preparatory to securing terminals thereto.

An object of the invention is to mechanically whip the ends of the cords with wire accurately, speedily, and with a minimum amount of manual labor.

Another object of the invention is to provide a practical and efficient mechanism of few parts and of simplified construction for whipping the ends of cords or the like.

In accordance with the general features of this invention there is provided a whipping mechanism which draws the wire guided from the supply source and whips it about the end of a cord which is carried upon a resiliently and reciprocally mounted support. Secured to the support is a nut sector adapted to be engaged by a rotating threaded sleeve when the support is depressed by the operator about its resilient mounting. The engagement of the nut sector with the rotating sleeve causes the cord support to be stepped back during the operation of the whipping mechanism so that the wire is whipped around the cord in a spiral formation. Upon a release of the cord support it moves up to its normal position, due to its resilient mounting, thereby disengaging the nut sector carried thereon from the rotating threaded sleeve. Means is also provided for returning the cord support to its normal position after being stepped back, thereby completing a reciprocatory movement of the cord support. Other means associated with the cord support and whipping mechanism function upon the return of the cord support to its normal position to establish the original relation therebetween.

Other objects and advantages of the invention will more fully appear from the following detailed description taken in connection with the accompanying drawings which illustrate one embodiment thereof.

In the drawings illustrating this mechanism,

Figure 1:
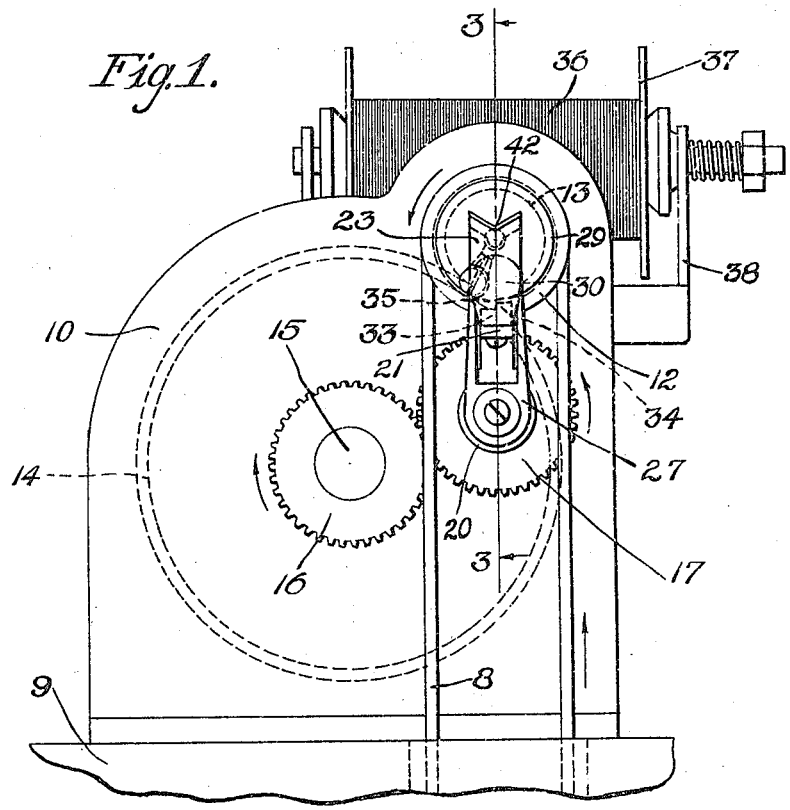
Fig. 1 is a front view of the mechanism.
Figure 2:
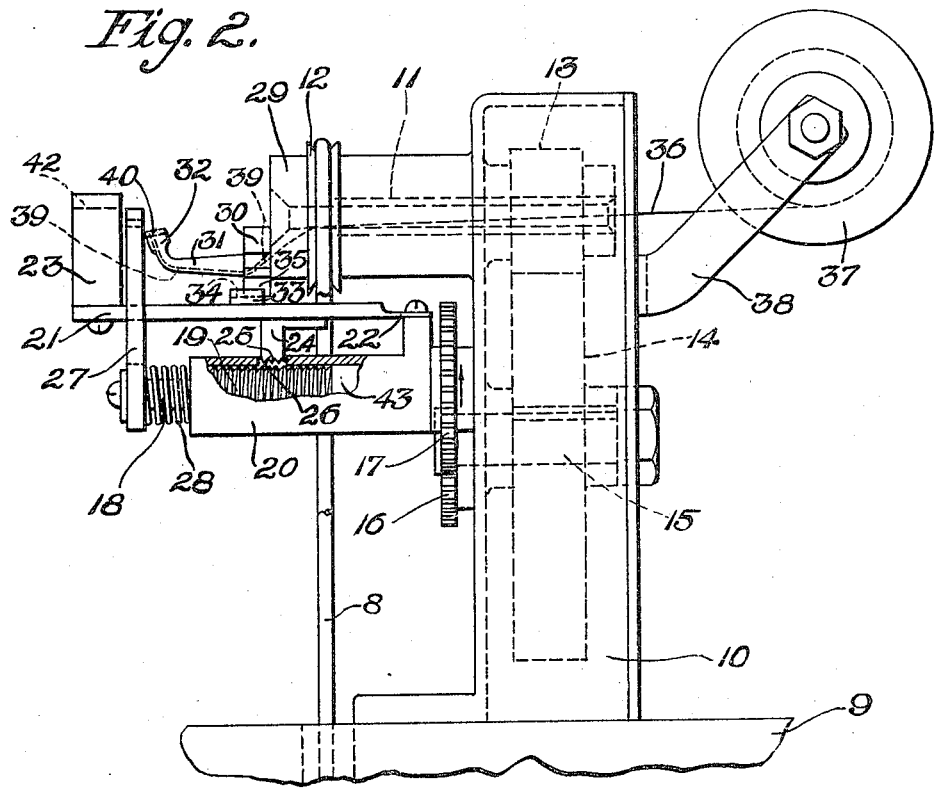
Fig. 2 is a view taken from the right-hand side of Fig. 1.
Figure 3:
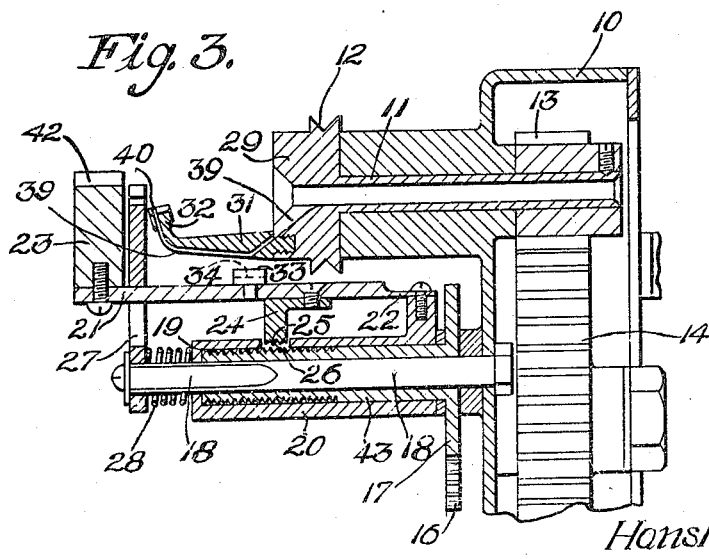
Fig. 3 is a vertical sectional view taken on the line 3—3 of Fig. 1 looking in the direction indicated by the arrows.

Referring now to the drawings in detail in which like reference numerals designate similar parts throughout the several views, the machine is mounted upon a bench 9, as best shown in Figs. 1 and 2. Carried upon a frame 10 is a hollow rotatable shaft 11 on one end of which is formed a main driving pulley 12 driven by a belt 8. Secured to the other end of the shaft 11 is a pinion 13 which meshes with a gear 14 carried by a shaft 15 extending through the frame or casing 10 and carrying upon its end a small gear 16 which meshes with a similar gear 17 rotatable upon a stationary shaft 18 suitably supported on the frame 10. The shaft 18 extends forward of the gear 17 and forms a support for an elongated hub or sleeve 43 formed on the gear 17 which is provided with a right-hand screw thread 19. Surrounding the threaded hub 43 and slidable thereon is a sleeve 20.

Mounted from the sleeve 20 and directly above the center thereof is a lever 21 provided with a flexible end 22. The lever 21 extends forward from the flexible end 22 and has secured to its end a cord support 23 provided with a V-shaped depression 42 in its top surface within which the end of the cord to be whipped is placed. Secured to the lower surface of the lever 21 intermediate its ends is a block 24 having formed upon its lower surface a nut sector 25, the threads of which are adapted to engage the screw thread 19 formed on the hub 43. The nut sector 25 projects into an opening 26 in the sleeve 20 and is brought into engagement with the screw thread 19 on the sleeve 43 when the lever 21 is depressed. Mounted around the projecting end of the shaft 18 and between the end of the sleeve 20 and an upwardly extending arm 27 is a compression spring 28 which serves to return the sleeve 20 to its normal position as shown in Fig. 1 upon the completion of a whipping operation. The pulley 12 is formed with a collar 29 at its forward end and eccentrically mounted thereon is a stud 30.

Mounted eccentrically upon the collar 29 adjacent the stud 30 is a whipping arm 31, the outside end 32 of which is provided with a U-shaped depression. Secured to the lever 21 directly below the stud 30 is a stud 33 provided with a shoulder 34, which when the machine is idle as shown in Figs. 1 and 2 engages a tooth 35 formed on the stud 30, thereby holding the whipping arm 31 stationary, the driving belt 8 slipping on the pulley 12.

A supply of wire 36 to be whipped around the end of a cord is carried on a spool 37 freely rotatable upon a bracket 38 secured to the rear end of the frame 10. The wire is led from the spool 37 and threaded through the hollow shaft 11 and guided to the end 32 of the whipping arm 31 in a groove 39 formed in the collar 29 and on one side of the arm 31, and then through an opening 40 in the end 32 of the whipping arm 31.

Figure 4:
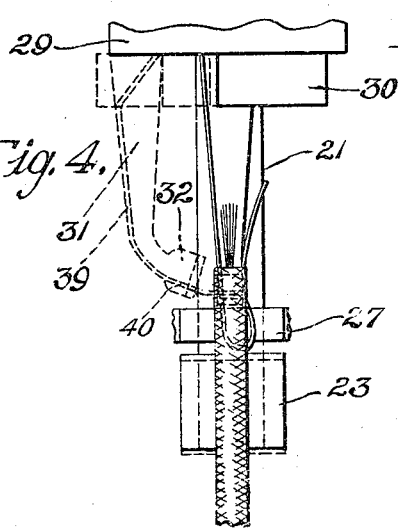
Fig. 4 is an enlarged plan view of a portion of Fig. 1.

The operation of the mechanism is as follows:

As illustrated in Fig. 1 the mechanism is shown in its normal position with the shoulder 34 of the stud 33 in engagement with the tooth 35, thereby holding the whipping arm 31 stationary with the driving belt 8 slipping on the pulley 12. The wire 36 is drawn through the opening 40 in the end of the whipping arm 31 and laid in the V-shaped depression 42 of the support 23 and thereafter looped back as shown in Fig. 4.

Within the V-shaped depression 42 of the cord support 23 and over the wire 36 looped therein is placed the end of the cord to be whipped with a portion of the insulation thereof forward of the opening 40 in the whipping arm 31. The bottom of the V-shaped depression 42 is normally positioned above the bottom of the V-shaped depression formed in the whipping arm, as well as above a V-shaped depression formed in the top surface of the arm 27.

The block 23, with the cord held thereon by the operator, is now depressed, which brings the center of the cord into line with the axis of the hollow shaft 11. The depression of the block 23, which is secured to the lever 21, moves the stud 33 away from the engagement with the stud 30 secured to the pulley 12. The belt 8 now causes the pulley 12 to revolve. The depression of the lever 21 also causes the nut sector 25 to move down and into engagement with the thread 19 on the hub 43 of the gear 17.

The whipping arm 31, being secured to the pulley 12, now revolves around the cord, wrapping that portion which extends forward of the arm 27 with wire. At the same time the thread 19 on the revolving hub 43 will cause the nut sector 25 to move rearward carrying the sleeve 20, the lever 21, and the block 23 with it.

Figures 5, 6:
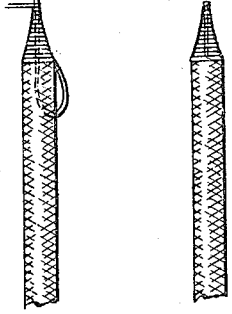
Fig. 5 is a view of a cord, which has had an end wound or whipped with wire, after removal from the machine but before being finished.
Fig. 6 is a view of the cord in a finished condition.

As the block 23 is moving rearward, the cord, which is held in place by the operator, moves with the block 23 and the revolving whipping arm 31 wraps wire around the cord in a spiral formation, as shown in Fig. 5.

The distance which the block 23 can move is limited by the distance which the sleeve 20 can move rearward, namely, the distance between the arm 27 and the end of the sleeve 20 allowing for the space occupied by the spring when compressed.

At the end of the rearward movement of the block 23 it is released by the operator, causing the lever 21 to move back to its normal position, Fig. 1, due to the action of its flexible end 22. At the same time the nut sector 25 is moved from engagement with the thread 19 and the spring 28 then functions to move the sleeve 18 back to its original position. This latter movement brings the stud 33 into engagement with the stud 30 secured to pulley 12, thereby stopping the whipping arm 31 and establishing the original relation between the whipping arm and cord support 23.

The operator then removes the cord from the block 23, drawing a short length of the wire from the opening 37 in the whipping arm 31 with the cord. Then the wire is cut and another loop is formed ready for the next cord.

To finish the whipped end of the cord, the end 41 of the loop, Fig. 5, is drawn tight and the end of the cord is then clipped, as shown in Fig. 6.

What is claimed is:

1. In a mechanism for whipping a core with a strand, means for whipping the strand around the core, a core support, actuating mechanism for moving said support, said core support adapted to be moved into and out of engagement therewith, and means adapted upon the return of said support to its normal position to establish the original relation between the support and the whipping means.

2. In a mechanism for whipping a core with a strand, means for whipping the strand around the end of the core, a resiliently mounted core support, and driving means for stepping said core support back during the whipping operation, said core support adapted to be moved into and out of driving engagement therewith upon a movement thereof about its resilient mounting.

3. In a mechanism for whipping a core with a strand, means for whipping the strand around the end of the core, a resiliently mounted reciprocal support for the core adapted to be stepped back during the whipping operation, driving means therefor, and means carried by said support adapted to connect said driving means with said core support upon a movement thereof about its resilient mounting.

4. In a mechanism for whipping a core with a strand, means for whipping the strand around the end of the core, a core support adapted to be stepped back during the whipping operation, driving means for stepping said support back, and resilient means for normally holding said support out of engagement with said driving means.

5. In a mechanism for whipping a core with a strand, means for whipping the strand around the core, a resiliently mounted core support, actuating means for moving said support, said core support adapted to be moved into and out of engagement therewith upon a movement of the support about its resilient mounting, and means for causing said whipping means to be returned to its starting position after an operation thereof.

6. In a mechanism for whipping a core with a strand, means for whipping the strand around the end of the core, driving means therefor, a resiliently mounted support for the core, driving means for stepping back said support during the whipping operation, said core support adapted to be operatively connected thereto upon a movement thereof about its resilient mounting, and means associated with said core support and said whipping means adapted to release said whipping means for operation and the driving means for stepping back the core support upon a movement of the core support about its resilient mounting.

7. In a mechanism for whipping the ends of cores with a strand, means for whipping the strand around the end of the core, a core support adapted to be stepped back during the whipping operation, driving means for stepping said support back, said core support adapted to be moved into and out of driving engagement therewith, and means associated with said support adapted upon the return of said support to its normal position to establish the original relation between the support and the whipping means.

8. In a mechanism for whipping the ends of cords with wire, means for whipping the wire around the end of the cord, a resiliently mounted cord support adapted to be stepped back during the whipping operation, operating means for stepping said support back, said cord support adapted to be operatively connected thereto upon a movement thereof about its resilient mounting, and means associated with said support adapted upon the return of said support to its normal position to establish the original relation between the support and the whipping means.

9. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, and a driving element, said cord support adapted to be moved into and out of driving engagement therewith.

10. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, a driving element, and means resiliently mounted for bringing said support into and out of engagement with said driving element.

11. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, a driving element, a member carried by said support adapted to form a driving engagement with said driving element, and resilient means associated therewith for normally holding said support out of engagement with said driving element.

12. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, said support capable of being moved in both vertical and horizontal directions, a driving element, and means for bringing said support into and out of engagement with said driving element, said means being resiliently mounted and adapted to normally hold said support out of engagement with said driving element.

13. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, said support capable of being moved in both vertical and horizontal directions, a threaded driving element, and means for bringing said support into and out of engagement with said driving element, said means being resiliently mounted and adapted to normally hold said support out of engagement with said driving element.

14. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, said support capable of being moved in both vertical and horizontal directions, a threaded driving element, and a nut sector associated with said support and adapted to be brought into and out of engagement with said threaded driving element.

15. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, said support capable of being moved in both vertical and horizontal positions, a threaded driving shaft, a nut sector associated with said support, and a lever with a flexible end associated with said support and nut sector, said lever adapted to be flexed about its flexible end to bring said nut sector into engagement with said threaded shaft.

16. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, said support capable of being moved in both vertical and horizontal directions, a threaded driving shaft, a sleeve surrounding said threaded shaft, a lever associated with said support and mounted on said sleeve, and a nut sector secured to said lever, said lever adapted to be flexed about its supporting end to cause said nut sector to project through an opening in said sleeve and thereby engage said threaded shaft.

17. In a mechanism for whipping the ends of cords, means for holding a supply of material, means for drawing the material from said supply, means for whipping the material about the end of the cord, a cord support adapted to be stepped back during the whipping operation, enabling the material to be whipped about the cord in a spiral formation, a lever and nut sector associated with said support, a stud on said lever, a threaded shaft, a pulley for driving said shaft, and an element secured to said pulley and adapted to engage with the stud on the lever to arrest the rotation of said pulley, said nut sector capable of being moved into and out of engagement with said threaded shaft.

18. In a mechanism for whipping a core with a strand, means for whipping the strand around the core, a core support, means for actuating said support, said core support adapted to be moved into and out of engagement therewith, means for returning said support to its normal position, and means associated with said support adapted to establish the original relation between the support and the whipping means.

In witness whereof, I hereunto subscribe my name this 19th day of December, A. D. 1923.

HANS HENRIK CHRISTIAN GRONDAHL.